(12) United States Patent
Shimizu

(10) Patent No.: US 6,530,187 B2
(45) Date of Patent: *Mar. 11, 2003

(54) PARTITION PASSAGE AND METHOD OF INSTALLING

(75) Inventor: Shohachi Shimizu, Ogaki (JP)

(73) Assignee: Mirai Industry Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,856

(22) Filed: Apr. 2, 1999

(65) Prior Publication Data

US 2001/0001355 A1 May 24, 2001

(30) Foreign Application Priority Data

Apr. 17, 1998 (JP) ............... 10-124076
Jan. 20, 1999 (JP) ............... 11-011823

(51) Int. Cl.⁷ .................. E04L 2/52
(52) U.S. Cl. ......... 52/220.1; 52/220.8; 52/232; 52/742.13; 52/741.4
(58) Field of Search ............ 52/220.1, 220.8, 52/232, 742.13, 742.14, 741.4, 745.21; 285/192, 915, 285.1

(56) References Cited

U.S. PATENT DOCUMENTS

| | | | |
|---|---|---|---|
| 4,424,867 A | * 1/1984 | Mallow | 52/220.8 X |
| 4,607,469 A | * 8/1986 | Harrison | 52/220.8 X |
| 4,751,031 A | * 6/1988 | Baars | 52/220.8 X |
| 4,848,043 A | 7/1989 | Harbeke | |
| 5,058,346 A | * 10/1991 | Spaeth | 52/220.8 X |
| 5,174,077 A | * 12/1992 | Murota | 52/220.8 X |
| 5,347,767 A | * 9/1994 | Roth | 52/220.8 X |
| 5,351,448 A | * 10/1994 | Gohlke et al. | 52/220.8 X |
| 5,456,050 A | * 10/1995 | Ward | 52/220.8 |
| 5,548,934 A | * 8/1996 | Israelson | 52/220.8 |

FOREIGN PATENT DOCUMENTS

| | | | |
|---|---|---|---|
| DE | 2525611 | 3/1977 | |
| DE | 3804927 | 8/1989 | |
| DE | 3918892 | 11/1990 | |
| DE | 285393 A | * 12/1990 | 52/220.8 |
| DE | 4008-032 A | * 9/1991 | 52/220.8 |
| DE | 4109614 | 9/1992 | |
| DE | 4234374 | 4/1994 | |
| EP | 54918 | * 6/1982 | 52/220.8 |
| FR | 2 485 677 A | 12/1981 | |

* cited by examiner

Primary Examiner—Carl D. Friedman
Assistant Examiner—Brian E. Glessner
(74) Attorney, Agent, or Firm—Akerman Senterfitt

(57) ABSTRACT

A seal structure for sealing between a through hole and a conduit located in the through hole. The seal structure includes a conduit located in the through hole and a foaming material. A wire is inserted in the conduit. The foaming material is located between the outer surface of the conduit and the inner surface of the through hole. The foaming material expands when heated and seals the space between the outer surface of the conduit and the inner surface of the through hole. Both ends of the conduit are sealed with a fireproof material between the inner surface of the conduit and the outer surface of the wire.

4 Claims, 5 Drawing Sheets

PARTITION PASSAGE AND METHOD OF INSTALLING

BACKGROUND OF THE INVENTION

The present invention relates to an apparatus and method for providing a sealed passage through partitions such as walls, floors, and ceilings for wires, pipes and the like.

FIG. 8 shows a prior art passage structure 37. The passage structure 37 is located in a through hole 34, which is formed in a partition such as a wall or a floor. The passage structure 37 includes a conduit 33 and fireproof material 35. The conduit 33 is inserted in the through hole 34 to pass through the partition 32. The fireproof material 35, which is material such as mortar or rock wool, fills the annular space between the outer surface of the conduit 33 and the inner surface of the through hole 34. A wire 36 passes through the conduit 33 and thus passes through the partition 32.

When the fireproof material 35 is put between the outer surface of the conduit 33 and the through hole 34, the pipe 33 must be retained at a certain position by a worker. The work is troublesome and difficult.

Generally, it takes two to three days for the fireproof material 35 to harden. The wire 36 cannot be inserted through the conduit 33 while the fireproof material 35 is hardening. This delays the construction work. There may be cases where the conduit 33 sinks in the fireproof material 35 due to its weight before the fireproof material 35 hardens. This produces a space between the conduit 33 and the fireproof material 35, and the conduit 33 is not firmly fixed in the partition 32. Further, extra work is necessary to fill the space with additional fireproof material 35. This lowers efficiency and increases construction costs.

SUMMARY OF THE INVENTION

The objective of the present invention is to provide a partition passage and an installation method that efficiently and effectively produces sealed passage between an inner surface of a through hole and an outer surface of a conduit.

To achieve the above objective, the present invention provides a passage structure for permitting an object to pass through a partition. A through hole is formed in the partition. A conduit is located inside the through hole. A foaming material fills a space between the outer surface of the conduit and the inner surface of the through hole by expansion. The foaming material is expanded after the conduit is located in the through hole and the foaming material, after expanding, seals the space between the inner surface of the through hole and the outer surface of the conduit.

The present invention further provides a method for sealing a space between an inner surface of a through hole and an outer surface of a conduit. The through hole is formed in a partition. The method includes the following steps: inserting the conduit into the through hole; locating a foaming material between the inner surface of the through hole and the outer surface of the through member; and expanding the foaming material by stimulating a reaction in the foaming material.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

First Embodiment

A passage structure 19 according to a first embodiment of the present invention will now be described in reference to the drawings.

Figure 1:
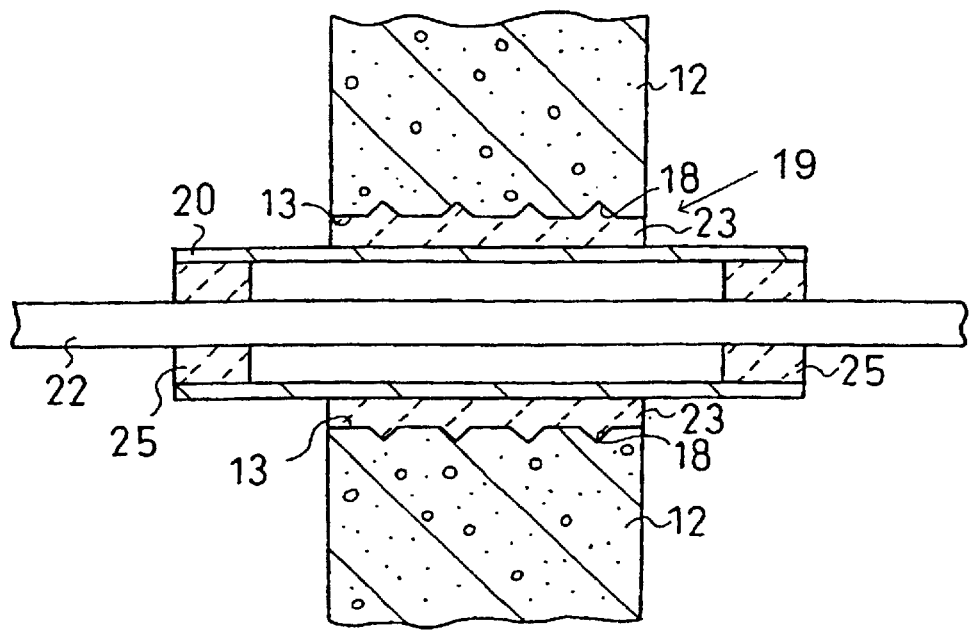
FIG. 1 is a cross-sectional view showing a passage structure according to a first embodiment of the present invention.
Figure 2:
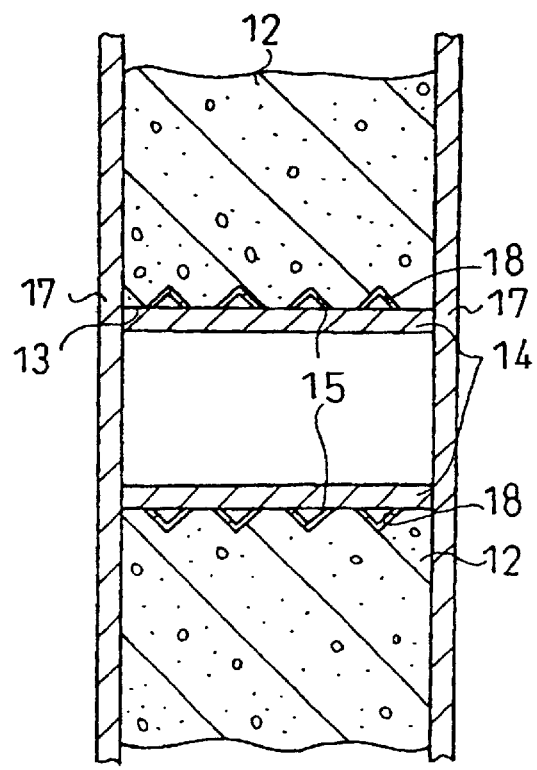
FIG. 2 is a cross-sectional view showing a mold for forming a partition and a through hole in the partition.

As shown in FIGS. 1 and 2, a through hole 13 is formed in a partition 12. The partition 12 may be a wall, floor, or ceiling of a building. A pipe form 14, which is part of a mold, is made of paper. As shown in FIG. 2, metal rings 15 are fitted on the outer surface of the pipe form 14. The cross-sectional shape of each metal ring is triangular.

The through hole 13 is formed when the partition 12 is formed. As shown in FIG. 2, wall forms 17 are arranged with a predetermined space in between. The pipe form 14 is located between the wall forms 17. Then, concrete is filled between the wall forms 17. The wall forms 17 are removed after the concrete hardens. Removing the pipe form 14 and the metal rings 15 leaves the through hole 13. A plurality of annular grooves 18 are formed on the inner surface of the through hole 13 by the metal rings 15. The cross sectional shape of the metal rings 15 is not limited to a triangular shape.

Figure 3:
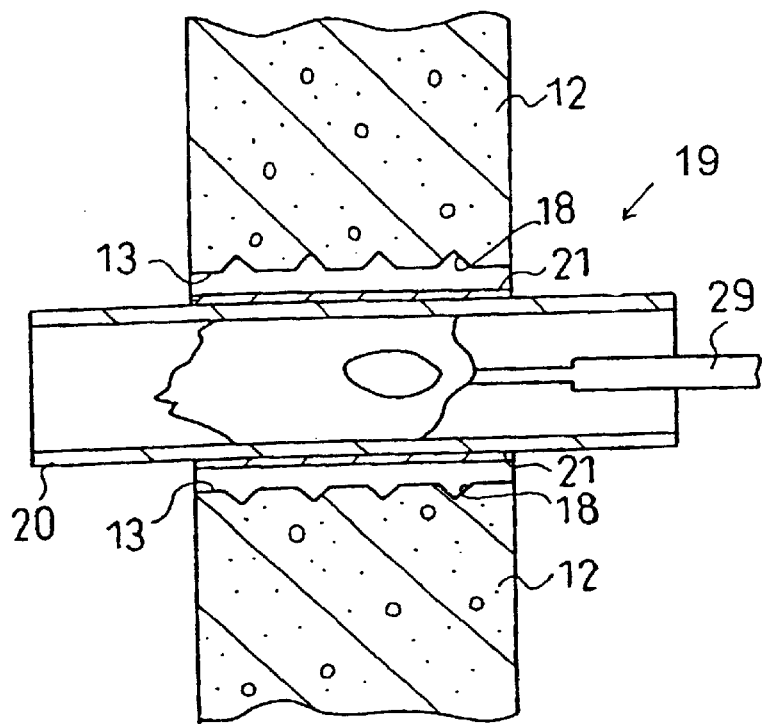
FIG. 3 is a cross-sectional view showing the seal structure of FIG. 1 being heated during installation.

As shown in FIG. 3, the passage structure 19 includes a conduit 20, which is inserted in the through hole 13, and foaming material 21 is adhered on the outer surface of the conduit 20 near the center of the conduit 20. The conduit 20 is made of metal. As shown in FIG. 1, a wire 22 is inserted in the conduit 20. The surface of the conduit 20, to which the foaming material 23 adheres, is preferably knurled. The main component of the foaming material 21 is a synthetic mica that has swelling property and is dispersed or dissolved in alkaline salt solution. The swelling mica is a scale-like fine powder of a sodium-fluorine mica that is synthesized by a solid state reaction. The fine powder has an average particle diameter of 1–5 μm and a thickness of 10 angstroms. The swelling mica forms a complex by intercalating an inorganic or organic compound between its layers. A sodium silicate is used as the alkaline salt. GRANDEX (registered trademark) FJ515, a product of TOKIWA ELECTRIC Inc., is preferably used for the foaming material 21.

A method for manufacturing the foaming material 21 will now be described.

When the scale-shaped powder of the swelling mica is dispersed in a sodium silicate solution, water molecules are adsorbed between the layers of the swelling mica. This swells the swelling mica. Then, the mica is finely cleaved between its layers, and an interlayer cation such as a sodium ion and a lithium ion is dissolved in the solution. Accompanying this, the space between the layers of the mica is negatively charged, and the surface of the layers is positively charged. In this state, a sodium ion, which derives from sodium silicate, is electrically attracted to the negatively charged space between the layers of the mica. Then, the sodium ion intercalates between the layers and an intercalation compound of mica is formed. This compound is the main component of the liquid foaming material 21. When the liquid foaming material 21 is heated and condensed, it changes into a gel-like material. This gel-like material is applied to the outer surface of the conduit 20.

When the gelled foaming material 21 is heated further, the foaming material 21 foams and expands following the evaporation of water. The foaming material 21 hardens to a sufficient degree after several minutes. When hardened, the volume of the foaming material 21 is three to five times the volume of the foaming material 21 when in its gel form.

This expansion is based on the following process. The reduction of water from heating is accompanied by the approach of the layers of mica to one another. Since the space between the layers is negatively charged and the surface of the layers is positively charged, the ends of each layer is attracted to the surface of another layer. Then, a three-dimensional molecular structure, which is bulky and shaped like a house of cards, is formed. As the water vaporizes, many spaces are formed in the foaming material 21. In other words, the foaming material 21 expands by the formation of the spaces and by the formation of the house-of-cards structure. As the water evaporates further, the foaming material 21 solidifies. The heating of the foaming material 21 is preferably performed at 150 to 200 degrees Celsius and, if necessary, at higher temperatures.

Figure 4:
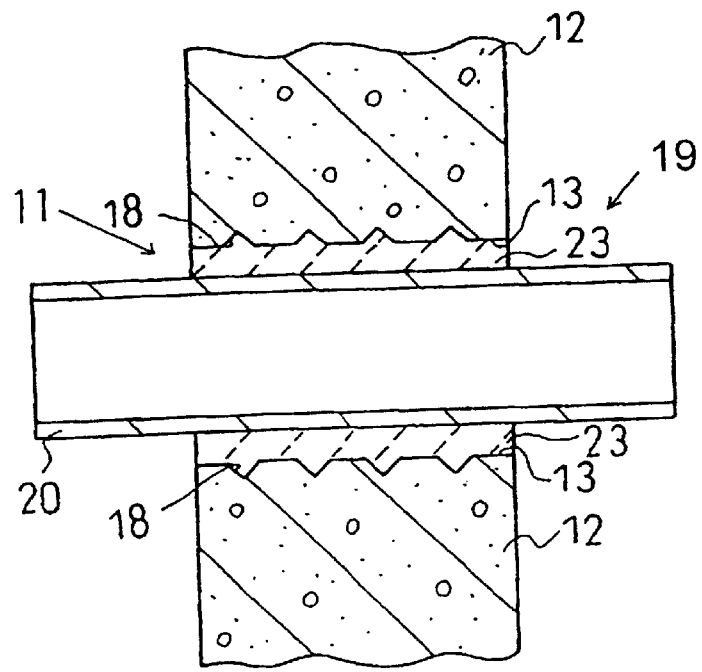
FIG. 4 is a cross-sectional view showing the passage structure of FIG. 3 after the installation is completed.

The passage structure 19 uses a characteristic of the foaming material 21. That is, before the passage structure 19 is inserted in the through hole 13, the gelled foaming material 21 is applied to the outer surface of the conduit 20. Then, the conduit 20 is inserted in the through hole 13 as shown in FIG. 3. The foaming material 21 is surrounded by the inner surface of the through hole 13. Then, a heating apparatus such as a burner 29 is inserted inside the conduit 20, and the foaming material 21 is heated through the conduit 20. Thus, the volume of the foaming material 21 is increased. As a result, as shown in FIG. 4, the foaming material 21 seals the annular space between the inner surface of the through hole 13 and the conduit 20. Tens of minutes later, the foaming material 21 completely hardens and becomes a fireproof filler 23. In this way, the conduit 20 is firmly fixed in the through hole 13.

After the fireproof filler 23 is formed, a wire 22 is inserted in the conduit 20 as shown in FIG. 1. To seal the space between the inner surface of the conduit 20 and the wire 22, fireproof material 25 is injected to fill both ends of the conduit 20. Material like a chloroprene rubber that includes sodium silicate hydrate (water glass) is used for the fireproof material 25.

The fireproof filler 23 fills the space between the through hole 13 and the conduit 20, and the fireproof material 25 fills the space between the conduit 20 and the wire 22. As a result, if a fire occurs in a building in which the passage structure 19 is installed, the through hole 13 and the conduit 20 will not provide a passage for fire and smoke. This slows the speed of fire and smoke.

The first embodiment has the following advantages. The foaming material 21 foams rapidly when heated and hardens quickly. This improves efficiency and prevents the formation of space caused by the weight of the conduit 20 between the fireproof filler 23 and the conduit 20. As a result, there is no need to refill the hole with the foaming material 21. Further, cost of construction is lowered due to the increased efficiency.

The conduit 20 is made of metal. This ensures efficient transmission of heat to the foaming material 21 through the conduit 20 when the conduit 20 is heated from inside. As a result, the foaming material 21 foams efficiently and the space between the through hole 13 and the conduit 20 is fully sealed by the fireproof filler 23.

The fireproof material 25 fills the space between the wire and the inner surface at both ends of the conduit 20. If a fire occurs in a building in which the passage structure is installed, the spread of fire and smoke is impeded.

The foaming of the foaming material 21 completely seals the space between the inner surface of the through hole 13, annular grooves 18, and the conduit 20. After tens of minutes, the foaming material hardens and forms the fireproof filler 23. Therefore, only a small amount of the foaming material 21 is necessary to form the fireproof filler 23.

The foaming material 21 is an inorganic material and does not carbonize when heated. Thus it is heat-resistant. If there is a fire, the fireproof filler 23, which is made of the foaming material 21, does not carbonize and impedes fire.

The foaming material 21 foams substantially uniformly, which positions the conduit 20 in approximately the center of the through hole 13. This avoids the task of manually holding the conduit 20 in the center of the through hole 13.

The gelled foaming material 21 foams by evaporation of water from the material 21 when heated. In addition, since the foaming material 21 includes swelling mica and sodium silicate, it hardens.

In the passage structure 19, the foaming material 21 is applied to the outer surface of the conduit 20. This reduces the number of parts required and facilitates installation.

The foaming material 21 is applied to the outer surface of the conduit 20 in advance of placing the conduit 20 in the hole 13. Thus, there is no need to inject the foaming material 21 between the through hole 13 and the conduit 20.

The volume of the foaming material 21 becomes three to five times the original volume after heating, and the foaming material hardens in tens of minutes. As a result, the wire 22 can be inserted in the conduit 20 without significant delay.

The annular grooves 18 formed on the inner surface of the through hole 13 resist movement and dislodgment of the fireproof filler 23.

The surface of the conduit 20 is rough. This also increases the resistance of the fireproof filler 23 against movement.

Second Embodiment

A passage structure according to a second embodiment of the present invention will now be described concentrating on differences from the first embodiment.

Figure 5:
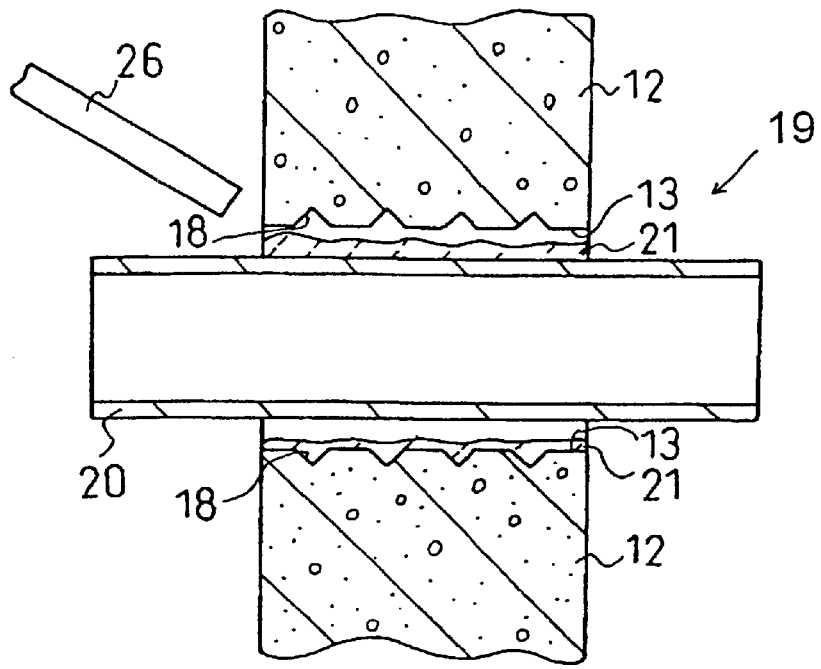
FIG. 5 is a cross-sectional view showing a passage structure according to a second embodiment of the present invention, with foaming material deposited after insertion of a conduit.

Unlike the method described with respect to the first embodiment, the foaming material 21 is not applied to the outer surface of the conduit 20 prior to insertion of the tube 20. Instead, as shown in FIG. 5, after the conduit 20 is inserted in the through hole 13, gel or liquid-type foaming material 21 is forced, or injected, between the inner surface of the through hole 13 and the conduit 20 by a dispenser apparatus 26. As in the first embodiment, the foaming material 21 is heated through the conduit 20 from inside by the burner 29 so that it foams. Then, the foaming material 21 seals the space between the inner surface of the through hole 13 and the conduit 20. The foaming material 21 hardens in tens of minutes and forms the fireproof filler 23. As a result, the conduit 20 is fixed in the through hole 13.

The second embodiment has the following advantages in addition to those of the first embodiment. The foaming material 21 is injected or delivered after the conduit 20 is inserted in the through hole 13. This permits the quantity off the foaming material 21 to be adjusted in accordance with the size of the space between the through hole 13 and the conduit 20. Therefore, the fireproof filler 23 effectively seals the space between the through hole 13 and the conduit 20. This further prevents waste of the foaming material 21 and thus lowers costs.

Third Embodiment

A third embodiment will now be described concentrating on the differences from the other embodiments.

Figure 6:
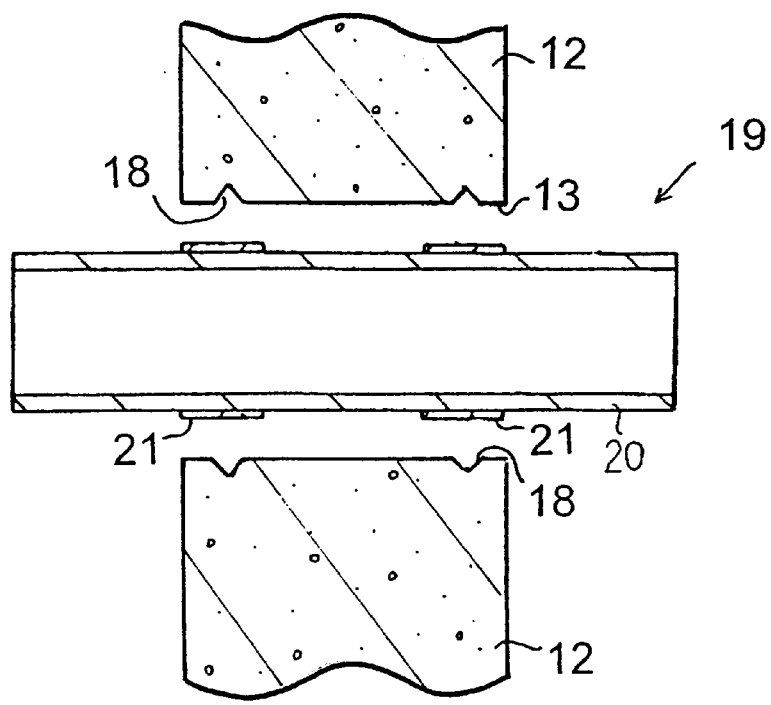
FIG. 6 is a cross-sectional view of a passage structure according to a third embodiment of the present invention.

In the third embodiment shown in FIG. 6, two bands of foaming material 21 are applied to separate sections of the outer surface of the conduit 20. The outer ends of the bands of foaming material 21 are axially spaced from one another by a distance that is about the same as the thickness of the partition 12. Therefore, when the conduit 20 is inserted in the through hole 13, the two bands of foaming material 21 are located inside the through hole 13. When the two bands of foaming material 21 are heated, as in the first embodiment, each band of foaming material 21 expands and seals a respective end of the through hole 13. Annular grooves 18 are formed to surround the parts of the foaming material 21.

According to the third embodiment, the amount of the foaming material 21 is reduced, which reduces costs.

Fourth Embodiment

A forth embodiment will now be described concentrating on the differences from the other embodiments.

In the fourth embodiment, a thermal expansion material 27 containing soft rubber material is used instead of the inorganic foaming material 21. First, the thermal expansion material 27 is applied to the outer surface of the conduit 20 in a cylindrical band. The thermal expansion material 27 may be applied to the outer surface of the conduit 20 after the conduit 20 is inserted. In that case, a sheet of thermal expansion material 27 may be placed around the surface of the conduit 20.

Figure 7A:
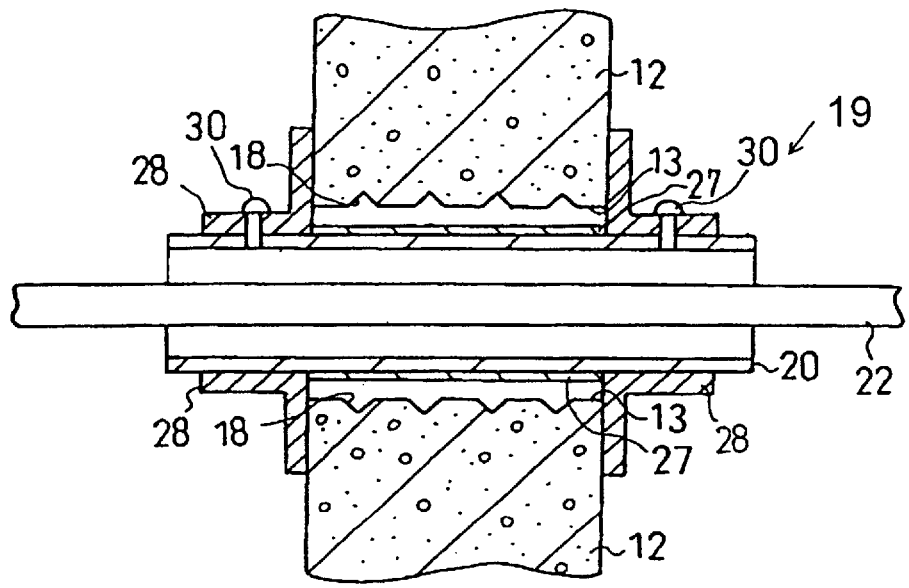
FIG. 7(a) is a cross-sectional view of a passage structure according to a fourth embodiment of the present invention prior to injection of foam passage structure.

As shown in FIGS. 7(a), (b), flanged retainers 28 are fixed to both ends of the conduit 20 by screws 30.

Figure 7B:
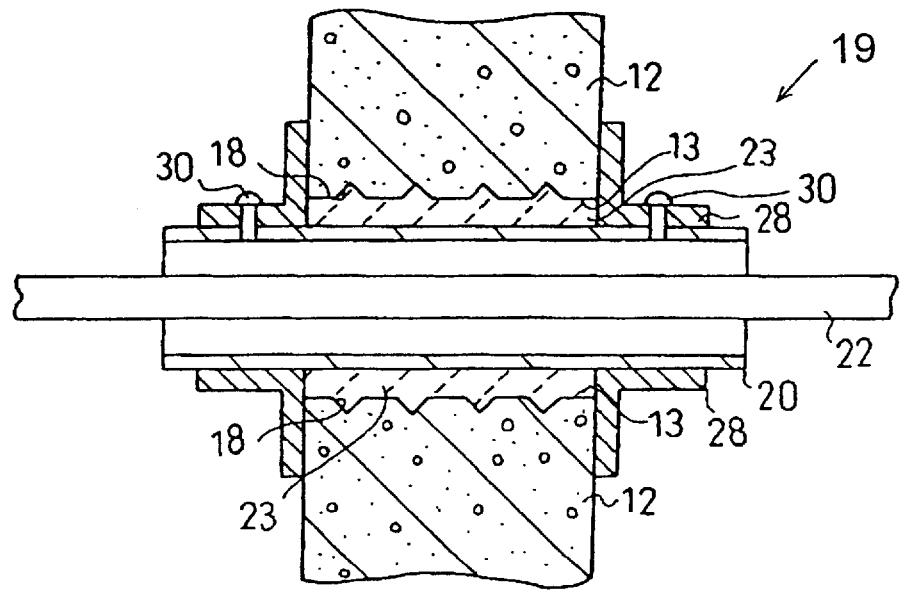
FIG. 7(b) is a cross-sectional view of the fourth embodiment after injecting foam passage structure.
Figure 8:
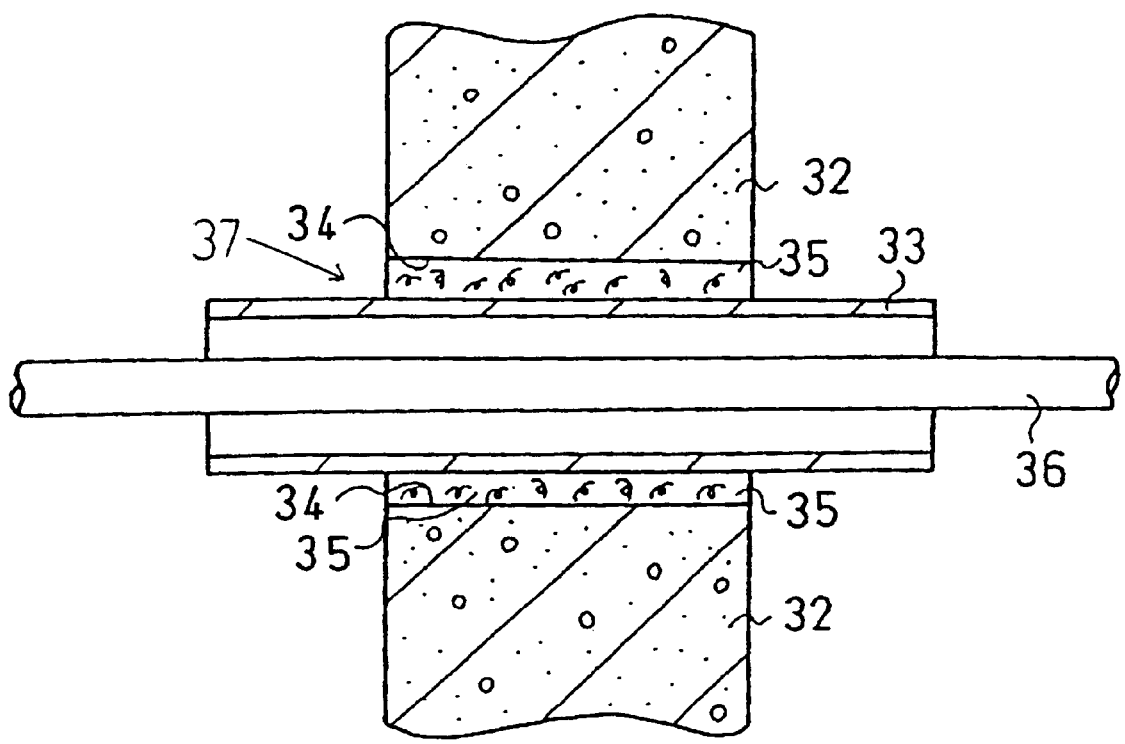
FIG. 8 is a cross-sectional view of a prior art passage structure.

The conduit 20 with the applied thermal expansion material 27 is inserted in the through hole 13. Then, the two retainers 28 are respectively fixed to the conduit 20 by the screws 30. In this way, the conduit 20 is fixed in the partition 12 (See FIG. 7(a)). When the conduit 20 and the retainers 28 are heated, the thermal expansion material 27 expands and forms the fireproof filler 23. In this way, the space between the inner surface of the through hole 13 and the conduit 20 is sealed. After cooling, the wire 22 is inserted in the conduit 20 (see FIG. 7(b)). The conduit 20 is fixed to the partition 12 by the thermal expansion material 27 and the retainers 28.

It is obvious to those skilled in the art that the first through the fourth embodiments may be varied as follows, and the following is within the spirit of the present invention.

In the second embodiment, the foaming material 21 may be applied to the inner surface of the through hole 13. In this case, the foaming material 21 is directly heated.

In the first through fourth embodiments, the metal rings 15 on the outer surface of the void pipe 14 may be omitted.

In the first through fourth embodiments, the foaming material 21 may be directly heated.

In the first through third embodiments, a cylindrical sheet of foaming material 21 may be placed on the outer surface of the conduit 20.

In the first through the fourth embodiments, a material like foam concrete, which expands and hardens by chemical reaction, may be used. For example, portland cement, quick lime. (calcium oxide CaO), silica rock, water, aluminum, foam stabilizer, and iron cuttings are mixed. The resulting slurry is delivered between the outer surface of the conduit 20 and the through hole 13.

In the slurry, calcium hydroxide is generated by the hydration of CaO and by the hydration of $3CaO.SiO_2$, $2CaO.SiO_2$ in the portland cement. Further, hydrogen gas ($H_2$) is generated by the reaction of quick lime, aluminum and water, or by the reaction of aluminum and water. This forms foam in the slurry. Accordingly, the slurry expands to a predetermined volume. Colloidal glue ($3CaO.2SiO_2.3H_2O$), which is generated by the hydration $3CaO.SiO_2$, $2CaO.SiO_2$ in the portland cement at the same time with the foaming, hardens the slurry. In this way, cellular concrete is formed, which seals the space between the outer surface of the conduit 20 and the through hole 13. As a result, the conduit 20 is firmly supported in the partition 12.

In the first through the third embodiments, the retainers 28 of the fourth embodiment may be used. In this case, the conduit 20 is more firmly attached to the partition 12.

In the first through the fourth embodiments, the shape of the conduit 20 is not limited to a cylindrical conduit. The cross-sectional shape of the conduit 20 may be square or triangular or otherwise polygonal.

In the first through the fourth embodiments, the object inserted in the conduit 20 is not limited to the wire 22. For example, a gas pipe or a water pipe may pass through the conduit 20.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A method for installing a conduit unit to a partition having a through hole, wherein the conduit unit includes a metal conduit and a heat expandable foaming member made of a single composition and located on the outer surface of the conduit, the method comprising the steps of:

inserting the conduit unit into the through hole; and heating inside of the metal conduit to fix the conduit unit to the partition by expanding the foaming member, wherein the foaming member seals the outer surface of the conduit and the inner surface of the through hole and hardens after expansion, wherein the conduit is supported at substantially center of the through hole by the hardened foaming member.

2. The method according to claim 1, wherein an object is inserted into the conduit after the hardening.

3. The method according to claim 2 further including sealing a space between the outer surface of the object and the inner surface of the conduit at the ends of the conduit.

4. The method according to claim 1, wherein the expanding step includes heating the foaming member.

* * * * *